(12) United States Patent
Menon

(10) Patent No.: US 10,395,134 B2
(45) Date of Patent: Aug. 27, 2019

(54) EXTRACTION OF SPECTRAL INFORMATION

(71) Applicant: University of Utah Research Foundation, Salt Lake City, UT (US)

(72) Inventor: Rajesh Menon, Salt Lake City, UT (US)

(73) Assignee: University of Utah Research Foundation, Salt Lake City, UT (US)

(*) Notice: Subject to any disclaimer, the term of this patent is extended or adjusted under 35 U.S.C. 154(b) by 1123 days.

(21) Appl. No.: 14/444,718

(22) Filed: Jul. 28, 2014

(65) Prior Publication Data

US 2015/0032402 A1   Jan. 29, 2015

Related U.S. Application Data

(60) Provisional application No. 61/947,632, filed on Mar. 4, 2014, provisional application No. 61/859,018, filed on Jul. 26, 2013.

(51) Int. Cl.
*G06K 9/46* (2006.01)
*G01J 3/28* (2006.01)

(52) U.S. Cl.
CPC .......... *G06K 9/4652* (2013.01); *G01J 3/2823* (2013.01)

(58) Field of Classification Search
CPC ............................ G06K 9/4652; G01J 3/2823
USPC ......................................................... 702/104
See application file for complete search history.

(56) References Cited

U.S. PATENT DOCUMENTS

| | | | |
|---|---|---|---|
| 4,648,051 A | 3/1987 | Wandell et al. | |
| 5,572,125 A | 11/1996 | Dunkel | |
| 7,196,317 B1* | 3/2007 | Meissner, II | A61B 5/1115 250/227.14 |
| 7,509,239 B2 | 3/2009 | Gollier et al. | |
| 7,570,357 B2 | 8/2009 | Tsenkova | |
| 7,688,447 B2 | 3/2010 | Shakespeare et al. | |

(Continued)

OTHER PUBLICATIONS

Alam; "Stability of eigenvalues and spectral decompositions under linear perturbation;" Linear Algebra and its Applications; vol. 364, May 1, 2003, pp. 189-211.

(Continued)

*Primary Examiner* — Ricky Ngon
(74) *Attorney, Agent, or Firm* — Thorpe North & Western, LLP

(57) ABSTRACT

A spectral distribution of incident light can be determined to increase collected spectral information. The spectral distribution of the incident light can be represented as a sum of spectral components after the incident light passes through a spectrum selective element. A signal at each color pixel of the spectrum selective element can be determined using, in part, the sum of the spectral components, where the spectral components are represented by a set of preliminary values. An error associated with the signal at each color pixel of the spectrum selective element is calculated. One or more perturbations are performed on each of the preliminary values and the error associated with the signal at each color pixel of the spectrum selective element is recalculated. The perturbations on each of the preliminary values is repeated until the error stabilizes within a predetermined range in order to assign the stabilized preliminary values as the spectral components in the incident light.

22 Claims, 7 Drawing Sheets

(56) References Cited

U.S. PATENT DOCUMENTS

| | | | |
|---|---|---|---|
| 8,049,963 B2 | 11/2011 | Menon et al. | |
| 8,098,698 B2 | 1/2012 | Dunstan et al. | |
| 8,462,981 B2 | 6/2013 | Determan et al. | |
| 8,669,461 B2 | 3/2014 | Menon | |
| 2004/0092804 A1* | 5/2004 | Rebec | A61B 5/14532 600/310 |
| 2005/0245796 A1* | 11/2005 | Woods | A61B 5/14532 600/315 |
| 2005/0267344 A1* | 12/2005 | Woods | A61B 5/14532 600/316 |
| 2008/0194983 A1* | 8/2008 | Laurence | G01J 5/0022 600/549 |
| 2009/0201490 A1* | 8/2009 | Gerlitz | A61B 5/14532 356/39 |
| 2012/0266937 A1 | 10/2012 | Menon et al. | |
| 2013/0079661 A1* | 3/2013 | Tolosa | A61B 5/01 600/549 |
| 2013/0090437 A1* | 4/2013 | Shah | B01J 21/08 526/106 |
| 2014/0063587 A1 | 3/2014 | Menon et al. | |
| 2014/0104614 A1 | 4/2014 | Rokitski et al. | |
| 2014/0104623 A1 | 4/2014 | Tsujii et al. | |
| 2014/0152839 A1 | 6/2014 | Menon | |

OTHER PUBLICATIONS

Kim et al.; "Design and analysis of multi-wavelength diffractive optics;" Opt. Exp. 20(2), 2814-2823 (Jan. 2012); Optical Society of America.

Liu; "Error analysis for a Galerkin-spectral method with coordinate transformation for solving singularly perturbed problems;" Applied Numerical Mathematics, Aug. 2001; vol. 38, Issue 3, pp. 315-345.

* cited by examiner

EXTRACTION OF SPECTRAL INFORMATION

RELATED APPLICATIONS

This application claims priority to U.S. Provisional Application No. 61/859,018, filed Jul. 26, 2013 and U.S. Provisional Application No. 61/947,632, filed Mar. 4, 2014, each of which are incorporated by reference.

BACKGROUND

Visible light is electromagnetic radiation that is visible to a human eye. Visible light is generally defined as having a wavelength in the range of 400 nanometers (nm) to 700 nm. Visible light has a shorter wavelength than infrared light, but a greater wavelength than ultraviolet light. The properties of visible light include intensity, propagation direction, frequency or wavelength spectrum, and polarization. A spectral distribution of the visible light represents a distribution of energy radiated at different wavelengths in a visible part of the spectrum. Spectral distribution can be useful for detection and sensing of toxic chemicals, explosives, contaminants in pharmaceuticals, food, etc., environmental pollutants, environmental monitoring, biomedical imaging such as pathology, etc., reconnaissance, remote sensing via drones, satellites, etc., anti-missile systems, and the like.

SUMMARY

A method for determining a spectral distribution of incident light can include representing the spectral distribution of the incident light as a sum of spectral components after the incident light passes through a spectrum selective element. A signal can be determined at each color pixel of the spectrum selective element using, in part, the sum of the spectral components. More specifically, the spectral components are represented by a set of preliminary values. An error associated with the signal can be calculated at each color pixel of the spectrum selective element. Using this information, one or more perturbations can be performed on each of the preliminary values. The error associated with the signal can be recalculated at each color pixel of the spectrum selective element. The perturbations on each of the preliminary values are repeated until the error stabilizes within a predetermined range in order to assign the stabilized preliminary values to the spectral components in the incident light.

In a similar manner, a method for determining a spectral distribution of incident light can include representing the spectral distribution of the incident light as a sum of known spectral components after the incident light passes through a spectrum selective element, where the known spectral components are associated with unknown weighting factors. A signal can be determined at each color pixel of the spectrum selective element using, in part, the sum of known spectral components. The unknown weighting factors are represented by a set of preliminary weighting values (e.g. initial estimates or starting values). An error associated with the signal can be calculated at each color pixel of the spectrum selective element. One or more perturbations can be performed on each of the preliminary weighting values while the error associated with the signal at each color pixel of the spectrum selective element is recalculated. The perturbations on each of the preliminary weighting values are repeated until the error stabilizes within a predetermined range in order to assign the stabilized preliminary weighting values to the spectral components in the incident light.

A corresponding system for determining a spectral distribution of incident light can be adapted to determine a signal at each color pixel of a spectrum selective element using, in part, a sum of the spectral components representing the spectral distribution of the incident light that passes through the spectrum selective element, where the spectral components are associated with a set of preliminary weighting values. The system can also perform one or more perturbations on each of the preliminary weighting values until an error associated with the signal at each color pixel of the spectrum selective element stabilizes within a predetermined range, where the stabilized preliminary weighting values are associated with the spectral components of the incident light.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

A technology is described for extracting a spectral distribution (or spectral content) of light. The light may be incident light or reflective light. The spectral distribution of the light can be extracted or detected after the incident light passes through a spectrum selective element. In some examples, the spectrum selective element can include a color-filter array in a digital camera or a grating/polychromat in a spectrometer. The spectral distribution of the light can be extracted from a signal collected at a sensor (e.g., a camera sensor). In one configuration, incident spectra can be extracted from the light using a modified direct binary search algorithm. In one example, the incident spectra of the light can be extracted using a priori knowledge of possible spectral components of the light. As discussed in greater detail below, extracting the spectral distribution of the light may be applicable to a variety of applications, such as using a mobile phone camera as a thermometer, using a digital camera to monitor health parameters, increasing a spectral resolution of spectrometers, etc.

Figure 1A:
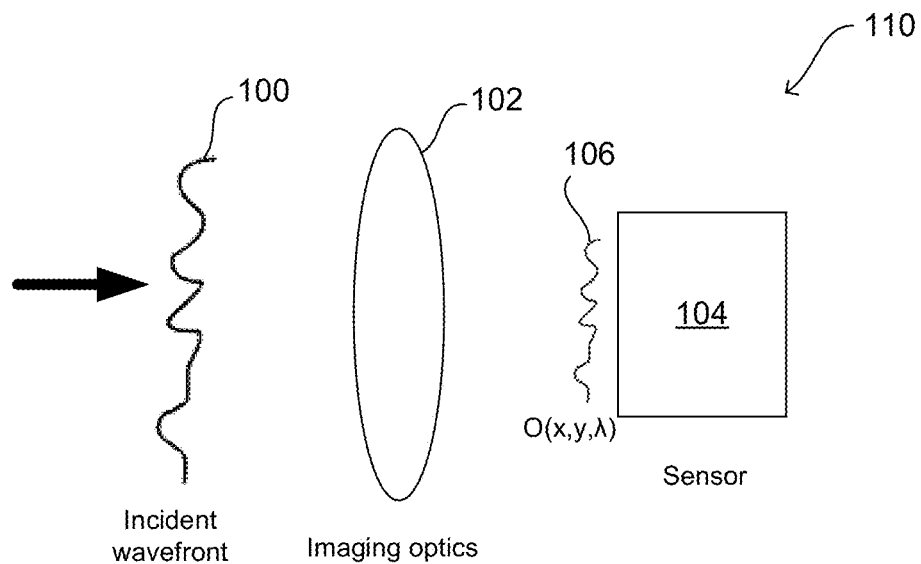
FIG. 1A is a diagram illustrating light that is transmitted through imaging optics positioned in front of a camera sensor in accordance with an embodiment of the present invention.

FIG. 1A generally shows an imaging system 110 illustrating light as an incident wavefront 100 that is transmitted through imaging optics 102 which are positioned in front of a camera sensor 104. Due to passing through the imaging optics 102 the wavefront is converted to a modified wavefront 106 incident on the camera sensor 104.

Figure 1B:
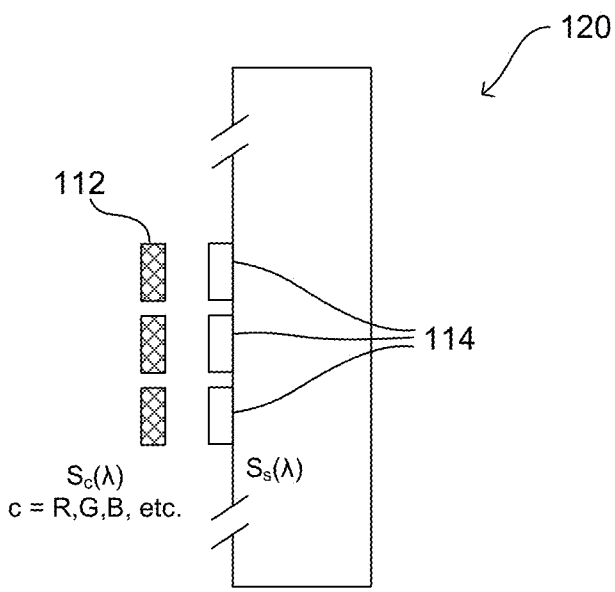
FIG. 1B is a diagram illustrating light that is transmitted through a color filter array positioned in front of a camera sensor in accordance with an embodiment of the present invention.

The wavefront can be represented as a function of position (x,y) and frequency. FIG. 1B is a diagram illustrating light that is transmitted through a color filter array 112 positioned in front of corresponding camera sensor pixels 114. At least a portion of the spectral content of an imaged object (i.e., the object spectrum) may be lost in imaging. The color filter array (or color filter mosaic) may be a mosaic of tiny color filters placed over the pixel sensors of an image sensor to capture color information. The color filters can be used because typical photosensors detect light intensity with little or no wavelength specificity, and therefore cannot separate color information. Thus, the color filters can filter incident light by wavelength range, such that separate filtered intensities can also include information about the color of light. Depending on the particular image, the spectral content may be lost because the color-filter array in front of the camera sensor may bin the incident spectra into three spectral bands (e.g., red, green blue spectral bands). In other words, in a camera, the object spectrum may be binned by transmission spectra of the sensor pixels at the color filter array. Therefore, it can be difficult to extract the actual spectral distribution of the incident light.

The wavefront incident on the sensor from the object is described by $O(x,y,\lambda)$, where (x,y) are spatial coordinates and $\lambda$ is the wavelength. The signal on any pixel of the sensor is given by Pc(x,y), which is defined as:

$$P_c(x,y) = \int O(x,y,\lambda) S_c(\lambda) d\lambda \quad \text{(Equation 1)},$$

wherein the subscript C refers to the colors (red, green, blue, etc.), and $S_c(\lambda)$ is the spectral transmission of each color pixel in the color-filter array. An integration can be performed over a range of wavelengths of interest (and those wavelengths present in the incident object wavefront). The spectral information that is spread over a continuous distribution of wavelengths in the object is converted into a small discrete number of values, and therefore, the overall spectral information can be lost. In general, spectral information may be lost in dispersive optical systems.

Figure 2A:
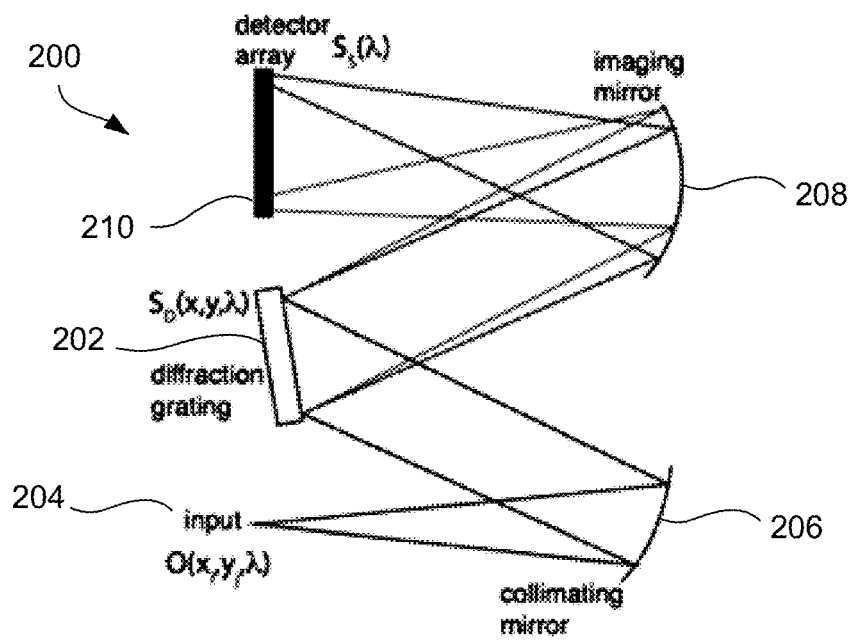
FIG. 2A is a diagram illustrating a dispersive imaging system (e.g., a spectrometer) using a grating in accordance with an embodiment of the present invention.
Figure 2B:
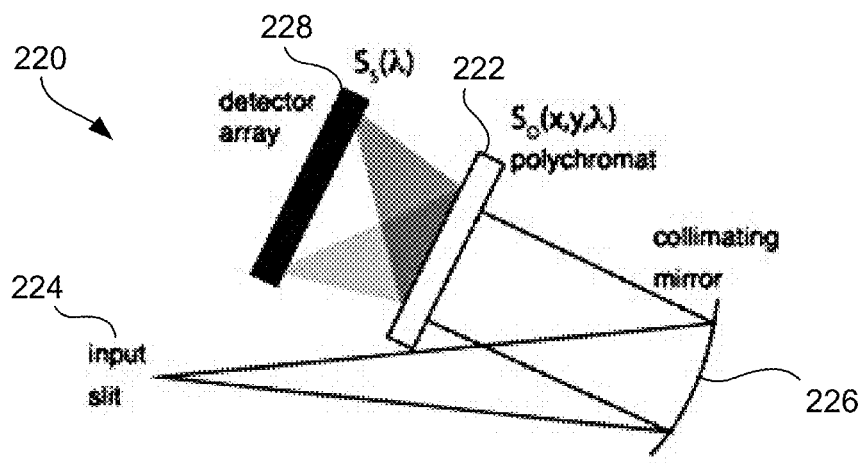
FIG. 2B is a diagram illustrating a dispersive imaging system (e.g., a spectrometer) using a dispersive polychromat in accordance with an embodiment of the present invention.

FIG. 2A is a diagram illustrating a dispersive imaging system 200 using a diffraction grating 202. The dispersive imaging system 200 can include an input 204 which is an incident light which is directed towards a collimating mirror 206. The collimating mirror 206 collimates the incident light which is directed towards the diffraction grating 202. The diffraction grating diffracts incident light and directs diffracted light towards an imaging mirror 208. The imaging mirror then redirects light to a detector array 210. FIG. 2B schematically illustrates a dispersive imaging system 220 using a dispersive polychromat 222. The dispersive imaging system 220 can include an input slit 224 which directs light to a collimating mirror 226. The collimating mirror 226 collimates incident light and redirects light to the polychromat 222 which selectively redirects various portions of incident light to different locations on a detector array 228. Suitable polychromats are generally described in U.S. Patent Application Publication Nos. 2012/0266937-A1, 2014/0152839-A1, and 2014/0063587-A1 which are each incorporated here by reference. The dispersive imaging systems 200 and 220 can also include a common spectrometer. The spectrometer is an instrument that can measure properties of light over a specific portion of the electromagnetic spectrum. In the spectrometer, the incident light is spectrally dispersed by a grating or a volume holographic element or a polychromat. The dispersed light is then redirected onto a sensor array. The dispersive imaging systems 200 and 220 can use a larger number of wavelength bins as compared to the color filter array 112 illustrated in FIG. 1B. However, some spectral information of the incident light can be lost in the dispersive optical systems 200 and 220.

In general, achieving spectral resolution (e.g., more wavelength bins) without decreasing photon throughput and increasing cost can be difficult. Decreasing photon throughput can be prohibitive when rapid imaging is performed (such as in fluorescence imaging of live cells) or when imaging very faint objects (such as distant stars). It can be advantageous to extract the spectral information with high wavelength resolution even when using a small number of wavelength bins, thereby allowing for cheaper, lighter and more efficient optical systems.

Accordingly, the signal on any pixel can be defined as:

$$P(x,y;x_i,y_j,\lambda) S_D(x,y,\lambda) S_S(\lambda) d\lambda, \quad \text{(Equation 2)},$$

wherein (x,y) are the coordinates of the sensor pixel, $(x_i,y_j)$ are the coordinates of the object point, $S_D(x,y,\lambda)$ is the spatial-spectral point spread function (PSF) of the dispersive optical system, and $S_S(\lambda)$ is the spectral sensitivity of the sensor. The spatial-spectral PSF can determine how the spectral information is spatially dispersed across the sensor array. The spatial-spectral PSF is a main function of the dispersive element, such as the grating or the polychromat. The spatial-spectral PSF can take into account the dispersive imaging systems 200 and 220 including any lenses and mirrors (such as those shown in FIGS. 2A and 2B). An integral is performed over the spectral range of interest and covering the spectral content of the object as outlined in more detail below. In this case, one point of the object can be imaged at a time. In other cases, multiple points can be imaged simultaneously as well. However, a trade-off may occur between spectral information content (wavelength resolution) and photon throughput (or optical efficiency). The approach can generally involve reconstruction algorithms to extract a spectrum, and the specific algorithm will change depending upon implementation. The following examples illustrate several non-limiting options.

Approach 1

A direct-binary search algorithm can be applied in order to obtain an estimate of the spectrum of the incident light. In one case, the direct-binary search algorithm can be applied using known spectral components that can possibly exist in the incident light. For instance, in astronomical spectroscopy, various elements in a star may be known (but not necessarily in what proportion they exist). Similarly, in fluorescence imaging, the spectra of fluorescent labels or biological organelles may be known, but contributions to a particular image are not known a priori. Therefore, the object spectrum can be represented as an incoherent sum of known spectra with unknown weighting factors as illustrated in Equation 3:

$$O(x,y,\lambda)=w_1 O_1(x,y,\lambda)+w_2 O_2(x,y,\lambda)+ \ldots + w_K O_K(x,y,\lambda)=\Sigma_{k=1}^{K} w_k O_k(x,y,\lambda),$$

wherein $w_k$ are the weights to be solved and there are K known spectral components. When comparing Equation 3 with Equation 1, an optimization can be performed in order to recover the correct spectrum as long as K>3 (i.e., greater than the number of distinct colors). The optimization can be performed using a modified version of the direct binary search algorithm.

The steps of the procedure (repeated independently for each object point (x,y) for determining the spectral distribution of incident light can include:

1. Begin with an initial set of weights {wk}. The initial set of weights may be chosen randomly or based upon prior knowledge of the measurement context or object. Optionally, the initial set of weights may be associated with known spectral components in the incident light.
2. Compute the signal at each color pixel as follows:

$$P'c(x,y)=\int \Sigma_{k=1}^{K} w_k O_k(x,y,\lambda) S_C(\lambda) S_S(\lambda) d\lambda, \quad \text{(Equation 4)},$$

wherein $S_c(\lambda)$ is the spectral transmission of each color pixel in the color-filter array and $S_S(\lambda)$ is the spectral sensitivity of the sensor. Accordingly, P'c(x,y) is the estimated image and Pc(x,y) is the actual image.
3. Compute an error defined as:

$$\varepsilon=\langle |P'_c(x,y)-P_c(x,y)| \rangle \quad \text{(Equation 5)},$$

wherein Pc(x,y) is defined as $$P_c(x,y)=\int O(x,y,\lambda) S_c(\lambda) d\lambda \quad \text{(Equation 1)},$$

wherein the $\langle \rangle$ operator represents an average over all of the color pixels and average over all the points (x,y) of the image if desired. If the average over all of the points is not taken, then the algorithm may be applied to each pixel independently.
4. Perturb one of the weights $w_k$ from the initial set of weights as follows:

$$w_k \rightarrow w_k+\delta, \quad \text{(Equation 6)},$$

wherein k may be chosen randomly or in some specified order and $\delta$ is a pre-determined perturbation. The value of the perturbation can be selected based on details of the problem and consideration of accuracy versus computing time (e.g. normalized values between 0 and 1). The weights can be ensured to be within a defined range as limited by the problem. Steps 2 and 3 are repeated using the perturbed weights. If the error is reduced from its previous value, the perturbation is kept and the algorithm proceeds with the next weight. In other words, the perturbation can be performed for each of the weights in the initial set of weights described in step 1. If the error is not reduced, then the algorithm moves to step 5.
5. Perturb the weight $w_k$ as follows:

$$w_4 \rightarrow w_k+\delta \quad \text{(Equation 7)},$$

wherein $\delta$ is the pre-determined perturbation. In other words, the weight $w_k$ is perturbed for an additional time. Steps 2 and 3 are repeated. If the error is reduced, then this perturbation is kept. If the error is not reduced, the perturbation is discarded (i.e., the previous value of the weight is retained). Then, the algorithm proceeds to step 4 with another weight.
6. Repeat steps 2 through 5 until the error does not change by a pre-determined minimum amount or a set maximum number of iterations have been completed.

Therefore, steps 1 through 6 can be performed in order to determine the spectral distribution of the incident light. In other words, the initial set of weights can be transformed into a set of weights that accurately match the spectral distribution of the incident light. The initial set of weights can be perturbed until the weights accurately match the spectral distribution of the incident light.

Approach 2

An alternative approach to determine the spectral distribution of incident light can be made by assuming that the object is described as discrete spectral samples (values at discrete wavelengths), as illustrated in Equation 8:

$$O(x,y,\lambda)=O_1(x,y,\lambda_1)+O_2(x,y,\lambda_2)+ \ldots +O_k= \Sigma_{k=1}^{K} O_k(x,y,\lambda_k)$$

where $\lambda_k$ are the discrete wavelengths for which the spectral values of the object are unknown. By choosing a sufficient number of wavelengths (as closely spaced as needed for desired imaging), a substantially continuous spectral distribution can be obtained. This is particularly useful when the spectral content of the object is unknown. In other words, the unknown value $O_k(x,y,\lambda_k)$ can represent the value of the spectrum at one wavelength $\lambda_k$ for a given object point (x,y).

Thus, the modified direct-binary search algorithm can be applied in order to determine the spectral distribution of the incident light as described below:

1. Begin with an initial set of values $\{O_k(x,y,\lambda_k)\}$ for each point (x,y) and a known set of wavelengths. This set can be chosen randomly or based upon knowledge of the measurement context or object.
2. Compute the signal at each color pixel as follows:

$$P'_c(x,y)=\Sigma_{k=1}^{K} O_k(x,y,\lambda_k) S_c(\lambda_k) S_S(\lambda_k) \Delta\lambda \quad \text{(Equation 9)}$$

3. Compute an error defined as: $\varepsilon=\langle |P'_c(x,y)-P_c(x,y)| \rangle$, wherein the $\langle \rangle$ operator represents an average over all the color pixels and averaged over all the points (x,y) of the image (if so desired). Note that if the average over all the points is not taken, then the algorithm can be applied to each pixel independently as in Approach 1.
4. Perturb one of the spectral values $O_k(x,y,\lambda_k)$ identified in step 1 as follows:

$$O_k(x,y,\lambda_k) \rightarrow O_k(x,y,\lambda_k)+\delta \quad \text{(Equation 10)},$$

wherein k is chosen randomly or in some specified order and $\delta$ is a small pre-determined perturbation. The value of this perturbation can be selected based on details of the problem. Then, steps 2 and 3 are repeated. If the error is reduced from its previous value, the perturbation is kept and the algorithm proceeds with the next value in the initial set of values as defined in step 1. If the error is not reduced, then the algorithm moves to step 5.

5. Perturb the $k^{th}$ spectral value as follows.

$$O(x,y,\lambda_k) \rightarrow O_k(x,y,\lambda_k)) - \delta \qquad \text{(Equation 11)}$$

Steps 2 and 3 are repeated. If the error is reduced, then this perturbation is kept. If the error is not reduced, the perturbation is discarded (i.e., the previous value is retained). Then, the algorithm proceeds to step 4 with another wavelength sample.

6. Repeat steps 2 through 5 until the error does not change by a predetermined minimum amount or a set maximum number of iterations have been completed. The steps 1 through 6 may be repeated for point (x,y) of the object.

Approach 3

This approach can be applied in the case of determining spectral distributions with respect to spectrometers. The object can be modeled using Equation 3:

$$O(x,y,\lambda) = w_1 O_1(x,y,\lambda) + w_2 O_2(x,y,\lambda) + \ldots + w_K O_K(x,y,\lambda) = \Sigma_{k=1}^{K} w_K O_K(x,y,\lambda),$$

wherein $w_k$ are the weights to be calculated and there are K known spectral components.

The steps of the procedure (repeated independently for each object point (x,y) include:
1. Begin with an initial set of weights {wk}. The initial set of weights can be chosen randomly or based upon prior knowledge of the measurement context or object. The initial set of weights can be associated with the known spectral components in the incident light.
2. Compute the signal at each sensor pixel as follows:

$$P(x,y;x_iy_j) = \int \Sigma_{k=1}^{K} w_K O_K(x,y,\lambda) S_D(x,y,\lambda) S_S(\lambda) d\lambda, \qquad \text{(Equation 12)},$$

wherein x,y) are the coordinates of the sensor pixel, and $(x_i,y_j)$ are the coordinates of the object point.

3. Compute an error defined as:

$$\varepsilon = \langle |P'(x,y;x_iy_j) - P(x,y;x_iy_j)| \rangle \qquad \text{(Equation 13)},$$

wherein the $\langle \rangle$ operator represents an average over all the points (x,y) of the image (if so desired). $P(x,y;x_iy_j)$ is the measured value. Furthermore, if the average over all the points is not taken, the algorithm may be applied to each pixel independently.

4. Perturb one of the weights $w_k$ as follows:

$$w_k \rightarrow w_k + \delta \qquad \text{(Equation 6)},$$

wherein k can be chosen randomly or in some specified order, and δ is a small pre-determined perturbation. The value of the perturbation may be chosen according to details of the problem. In addition, the weights may be ensured to be within a reasonable range as limited by the problem. Steps 2 and 3 are repeated. If the error is reduced from its previous value, the perturbation is kept and the algorithm proceeds with the next weight in the initial set of weights, as defined in step 1. If the error is not reduced, then the algorithm proceeds to step 5.

5. Perturb the weight wk as follows:

$$w_k \rightarrow w_k - \delta \qquad \text{(Equation 7)}.$$

Steps 2 and 3 are repeated. If the error is reduced, then this perturbation is kept. If the error is not reduced, the perturbation is discarded (the previous value of the weight is retained). Then, the algorithm proceeds to step 4 with another weight.

6. Repeat steps 2 through 5 until the error does not change by a pre-determined minimum amount or a set maximum number of iterations have been completed.

Approach 4

An alternative approach consistent with the invention can be made by assuming that the object can be described as discrete spectral samples (values at discrete wavelengths) given by Equation 8:

$$O(x,y,\lambda) = O_1(x,y,\lambda_1) + O_2(x,y,\lambda_2) + \ldots + O_K(x,y,\lambda_k) = \Sigma_{k=1}^{K} O_k(x,y,\lambda_k),$$

where $\lambda_k$ are the discrete wavelengths when determining the spectral values of the object. By choosing a sufficient number of wavelengths (as closely spaced as needed), a continuous spectral distribution can be obtained. The continuous spectral distribution is particularly useful when the spectral content of the object is unknown. In other words, the unknown value $O_K(x,y,\lambda_k)$ represents the value of the spectrum at one wavelength $\lambda_k$ for a given object point (x,y). A modified direct binary search algorithm can be applied as described below. In the steps below, the below formulation can be used in an optimization algorithm in the case of the spectrometer (when there are a relatively large number of sensor pixels). In this approach, the steps for determining the spectral distribution can include:

1. Begin with an initial set of values $\{C_K(x,y,\lambda_k)]$ for each point (x,y) and a known set of wavelengths. The set can be chosen randomly or based upon knowledge of the measurement context or object. Thus, if some a-priori information about the unknown spectrum or object is known, then such information can be incorporated into the starting point. For example, a coarse spectrum, specific bandwidth or spatial resolution, etc. Incorporation of a-priori information allows the algorithm to converge faster and more accurately.

2. Compute the signal at each color pixel as follows:

$$P(x,y;x_iy_j) = \Sigma_{k=1}^{K} O_k(x,y,\lambda_k) S_D(\lambda_k) \Delta\lambda \qquad \text{(Equation 14)}$$

3. Compute an error term defined as:

$$\varepsilon = \langle |P'(x,y;x_iy_j) - P(x,y;x_iy_j)| \rangle, \qquad \text{(Equation 13)},$$

wherein the $\langle \rangle$ operator represents an average over all of the sensor pixels and averaged over all the points (x,y) of the image (if so desired). If the average over all the points is not taken, the algorithm can be applied to each pixel independently. $P(x,y;x_i y_j)$ is the measured value.

4. Perturb one of the spectral values $O_k(x,y,\lambda_k)$ as follows:
   $O_k(x,y,\lambda_k) \rightarrow O_k(x,y,\lambda_k) + \delta$, wherein k can be chosen randomly or in some specified order and δ is a small pre-determined perturbation. The value of this perturbation can be chosen based upon the actual details of the problem. Steps 2 and 3 are repeated. If the error is reduced from its previous value, the perturbation is kept and the algorithm proceeds with the next value (step 4). If the error is not reduced, then the algorithm moves to step 5.

5. Perturb the $k^{th}$ spectral value as follows:

$$O_k(x,y,\lambda_k) \rightarrow O_k(x,y,\lambda_k) + \delta, \qquad \text{(Equation 11)}$$

Steps 2 and 3 are repeated. If the error is reduced, then the perturbation is kept. If the error is not reduced, the perturbation is discarded (the previous value is retained). Then, the algorithm proceeds to step 4 with another wavelength sample.

6. Repeat steps 2 through 5 until the error does not change by a pre-determined minimum amount or a set maximum number of iterations have been completed.

7. Repeat the steps 1 through 6 for point (x,y) of the object.

Figure 3:
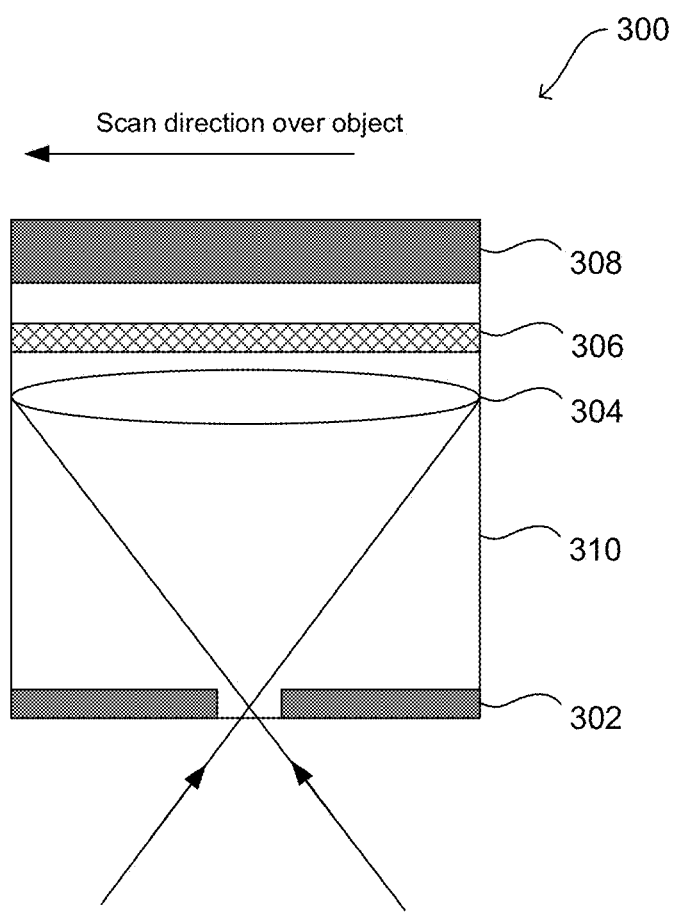
FIG. 3 is a diagram illustrating a linear (1D) hyper and multi-spectral imager in accordance with an embodiment of the present invention.

FIG. 3 is a system 300 illustrating an alternative configuration for a spectrometer. In particular, FIG. 3 illustrates a linear (1D) hyper and multi-spectral imager. In general, a multispectral image is one that captures image data at specific frequencies across the electromagnetic spectrum. As shown in FIG. 3, a 1D slit 302 allows a single line of pixels from the image to pass through. The line of pixels can be collimated by a cylindrical lens 304. The collimated broadband light is then incident on a polychromat 306, which spectrally disperses the light onto a linear (1D) sensor array 308. The system 300 can be housed within an enclosure 310 which prevents light from entering other than through slit 302.

For the example shown in FIG. 3, Equation 2 can be modified as follows:

$$P(x; x_i) = \int O(x_i, \lambda) S_D(x, \lambda) S_S(\lambda) d\lambda, \quad \text{(Equation 12)}.$$

The y pixels in the line of pixels can be processed simultaneously if a 2D sensor array is utilized. In that case, the line of sensor pixels going out of the plane of the paper represents the y pixels from the object.

Equation 12 may be discretized approximately as shown in Equation 13:

$$P(x_n; x_i) \approx \Sigma_{m=1}^M O(x_i, \lambda_m) S_D(x_n, \lambda_m) S_S(\lambda_m),$$

where $x_n$ is the $n^{th}$ sensor pixel and $\lambda_m$ is the $m^{th}$ wavelength sample of the spectrum. Equation 12 can be rewritten as Equation 14:

$$P(x_1, x_i) \ldots P(x_M, x_i) = [Ox_i, \lambda_1) \ldots O(x_i \lambda_M)] \begin{bmatrix} S(x_1, \lambda_1) & \ldots & S(x_1, \lambda_M) \\ \vdots & \ddots & \vdots \\ S(x_N, \lambda_1) & \ldots & S(x_N, \lambda_M) \end{bmatrix},$$

where $S = S_U S_S$. The linear system of equations can be solved if $M \geq N$ by using Equation 15:

$$[Ox_i, \lambda_1) \ldots O(x_i \lambda_M)] = \begin{bmatrix} S(x_1, \lambda_1) & \ldots & S(x_1, \lambda_M) \\ \vdots & \ddots & \vdots \\ S(x_N, \lambda_1) & \ldots & S(x_N, \lambda_M) \end{bmatrix}^{-1} [P(x_1, x_i) \ldots P(x_M, x_i)].$$

In Equation 15, $P(x_M, x_i)$ is comprised of the measured values from the sensor, while $P(x_1, x_i)$ is obtained by calibration. If M<N, then the modified binary-search algorithm can be applied as described earlier. In both cases, the spectral resolution can be determined by the number of sensor pixels in the x direction (i.e., the axis over which dispersion occurs). Such a device can be useful in an unmanned aerial vehicle (UAV), such as drone or satellite. The natural motion of the vehicle can serve as the scan to build up 2HD hyper- or multi-spectral images. In one example, a scan that occurs when the UAV moves over the target region can be performed using a mirror.

Figure 4:
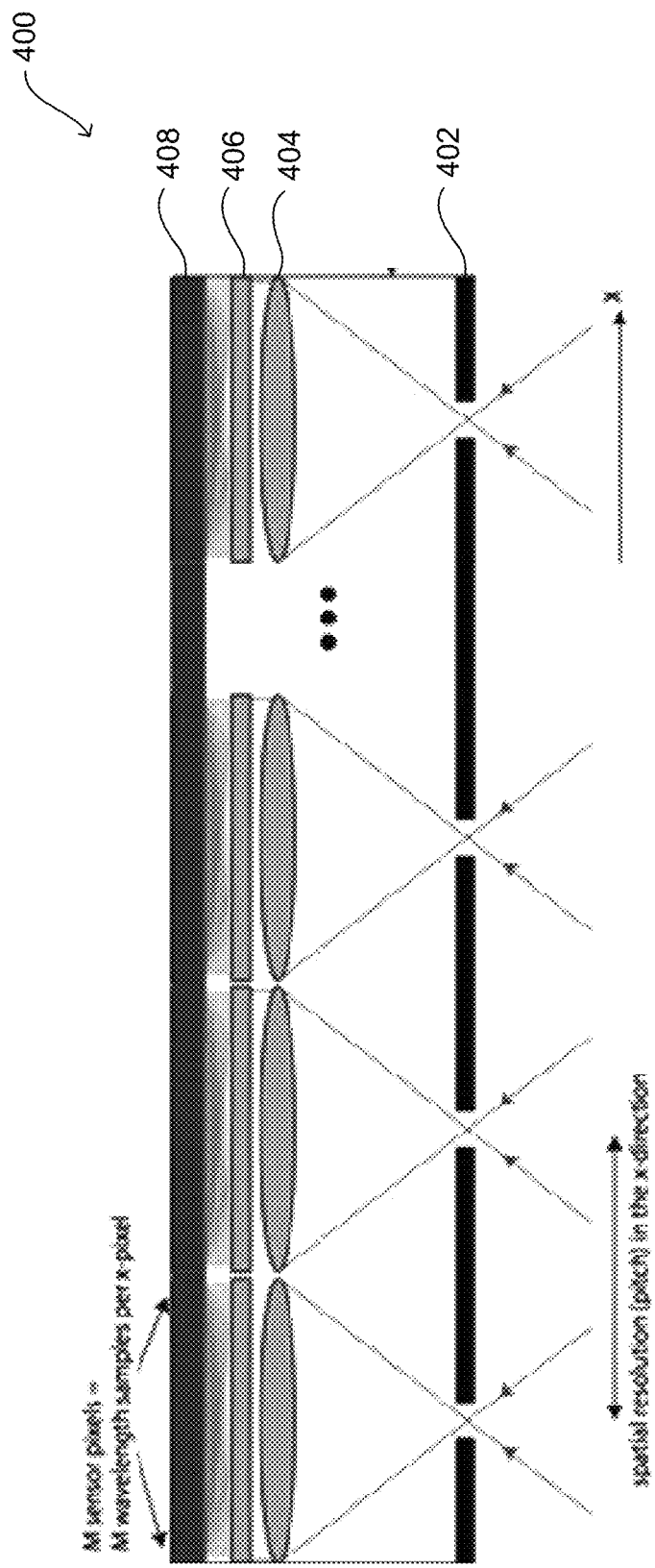
FIG. 4 is a diagram illustrating an arrayed two-dimensional (2D) hyper and multi-spectral imaging system in accordance with an embodiment of the present invention.

FIG. 4 is a schematic illustrating an arrayed two-dimensional (2D) hyper and multi-spectral imaging system 400. The arrayed system 400 can enable 2HD imaging without scanning or mirrors. The arrayed system can include an array of linear pinholes 402 (or slits). An array of cylindrical micro lenses 404 can collimate incoming light. In addition, an array of polychromats 406 can disperse the incoming light onto a 2D sensor array 408. The sensor array 408 can comprise individual discrete devices or a combined device. In this case, a 2D image can be formed in a single frame capture. The trade-off is that the spatial resolution of the image in the X-direction is substantially equal to the spacing 410 between the pinholes, as shown in FIG. 4. The spacing 410 can be reduced by using smaller sensor pixels or by using fewer sensor pixels to disperse the light (i.e., reduce M). The latter approach can reduce spectral resolution. Such a device allows for the generation of 2D hyper- or multi-spectral image in a single frame, so that image acquisition can occur relatively fast.

Figure 5:
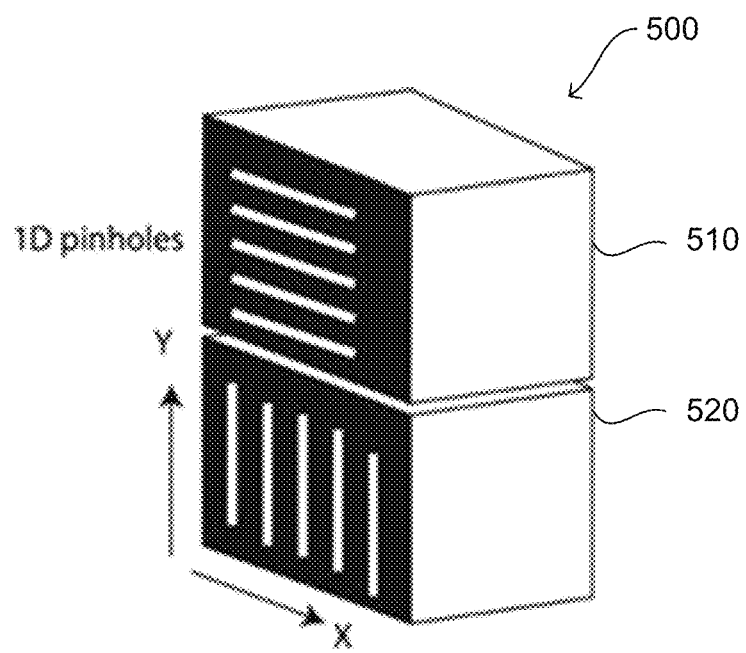
FIG. 5 is a diagram illustrating a first imaging system that is rotated 90 degrees with respect to a second imaging system in accordance with an embodiment of the present invention.

FIG. 5 is a composite device 500 including a first imaging system 510 that is rotated 90 degrees with respect to a second imaging system 520. The first imaging system 510 and the second imaging system 520 can be rotated 90 degrees with respect to the other if substantially equal spatial resolution is desired in both directions. If the systems 510 and 520 are closely spaced (as illustrated in the example in FIG. 5), image processing algorithms can be used to combine the individual images to obtain a single image of substantially equal spatial resolution in both axes. Although a variety of algorithms can be used and are known, non-limiting examples include simple interpolation, as well as sophisticated filtering which allow combination of images. If the systems 510 and 520 are spaced by a known distance apart, the resulting two images can be used to obtain 3D image data via the application of triangulation and related algorithms. Since the imaging systems 510 and 520 can be compact, light and relatively inexpensive, more than two systems can be used. As a result, 3D images of scenes with hyper-spectral and multi-spectral resolution at high speeds can be acquired. Such combinations of systems could be used for automobiles, machine vision, etc.

The extraction of the spectral distribution of the incident light may be applicable to a variety of applications. In one example, the extraction of the spectral distribution may be beneficial when using a mobile phone camera as a thermometer. An image of the human skin can be captured and the direct-binary search algorithm as described above can be applied (e.g., approach 1). As a result, a reflectance spectral signature can be extracted from the image. If the reflectance spectra have been previously calibrated to body temperature, the extracted spectrum can be matched to look up the body temperature. In other words, a simple digital camera can thus be used as a thermometer. In addition, an existing light source (e.g., an LED flash on the mobile phone camera or the screen backlight) can be used to illuminate the human skin to provide consistency in the images.

In another example, the extracted spectral information can be used to ascertain health parameters, such as glucose in blood, blood-pressure, etc. The health parameters can be ascertained if the spectra are calibrated as a function of the desired parameter. By calibration, a lookup table of spectra can be created (i.e., different spectra for each value of the parameter). By matching the extracted spectra (e.g., from the camera image), the lookup table can be used to estimate the value of the health parameter. The lookup table can be valid for any parameter as long as there is a change in spectra with the parameter. For example, reflectance spectra of the skin may indicate the oxygen level of blood flowing in capillaries located in proximity to the surface of the skin. In other words, the oxygen level of the blood can be monitored with images from a digital camera. Similarity, blood sugar (or glucose) levels can be monitored without actually taking any blood from a patient. Rather, the direct-binary search algorithm as described above can essentially allow for the conversion of a digital camera to a spectrometer. In addition, the direct-binary search algorithm as described above can allow for large scale environmental monitoring since a number of mobile phones can capture images of standard images, such as the sun, sky, moon, etc. If the spectra to the environmental element of interest can be calibrated, then the parameter can be measured.

In yet another example, the extraction of the spectral distribution of the light may be useful to increase the spectral resolution of spectrometers. Spectrometers are used in a huge number of applications ranging from microscopy to astronomy to airport security and counter-intelligence, materials research and environmental monitoring. For example, in a handheld spectrometer, lightweight and compact inexpensive optics may be desired, but at the tradeoff of spectral resolution. Therefore, the direct-binary search algorithm described above can provide a handheld spectrometer with an increased amount of spectral information without making such tradeoffs.

Figure 6:
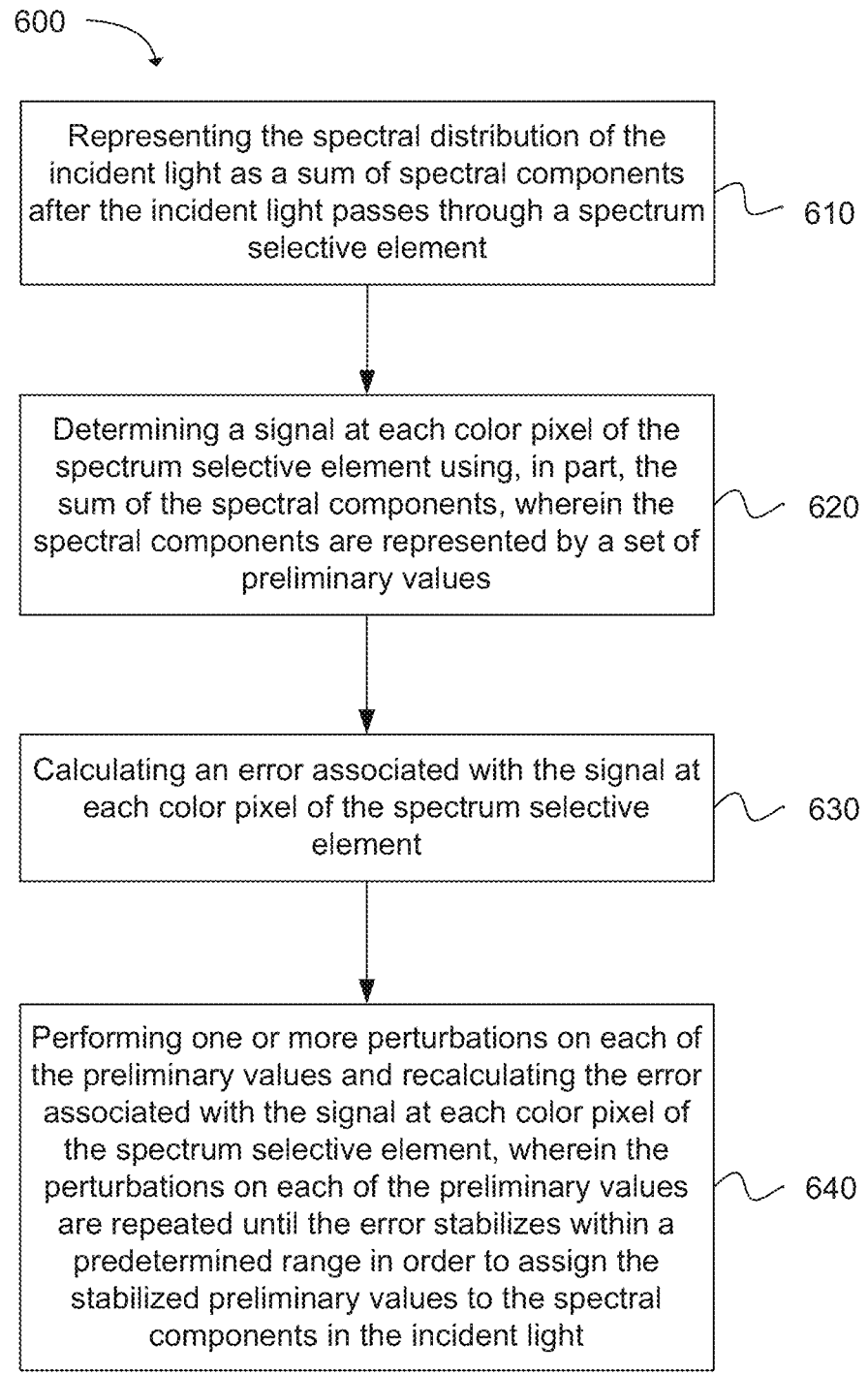
FIG. 6 is a flowchart of an example method for determining a spectral distribution of incident light.

In accordance with one embodiment of the present invention, a method 600 for determining a spectral distribution of incident light is disclosed, as illustrated in FIG. 6. The spectral distribution of the incident light can be represented as a sum of spectral components after the incident light passes through a spectrum selective element, as in block 610. A signal at each color pixel of the spectrum selective element can be determined using, in part, the sum of the spectral components, wherein the spectral components are represented by a set of preliminary values, as in block 620. An error associated with the signal at each color pixel of the spectrum selective element can be calculated, as in block 630. One or more perturbations can be performed on each of the preliminary values and the error associated with the signal at each color pixel of the spectrum selective element can be recalculated, wherein the perturbations on each of the preliminary values are repeated until the error stabilizes within a predetermined range in order to assign the stabilized preliminary values to the spectral components in the incident light, as in block 640.

In one configuration, the spectral components are each a combination of a known spectra with an unknown weighting factor. Alternatively, the spectral components are each an unknown discrete spectral sample value. In addition, performing the one or more perturbations is accomplished by perturbations on weights associated with the spectral components according to a predefined number of perturbations.

In one example, the set of preliminary values are randomly chosen or based on preliminary knowledge of the spectral distribution of the incident light. In addition, the spectrum selective element includes a color-filter array in a digital camera or a grating or polychromat in a spectrometer. Furthermore, the spectral distribution of the incident light is determined using a direct-binary search technique.

In one configuration, the spectral distribution of the incident light can be represented as $O(x,y,\lambda)=w_1 O_1(x,y,\lambda)+w_2 O_2(x,y,\lambda)+\ldots+w_K O_K(x,y,\lambda)=\Sigma_{k=1}^{K} w_k O_k(x,y,\lambda)$, wherein $(x,y)$ are spatial coordinates, $\lambda$ is a wavelength, K is a known number of spectral components and $w_k$ are the weights. Alternatively, the spectral distribution of the incident light may be represented as $O(x,y,\lambda)=O_1(x,y,\lambda_1)+O_2(x,y,\lambda_2)+\ldots+O_K=\Sigma_{k=1}^{K} O_k(x,y,\lambda_k)$, wherein $\lambda_k$ are the discrete wavelengths for which the spectral values of the object are unknown.

In one example, the signal at each color pixel of the spectrum selective element can be determined using at least one of: $P'c(x,y)=\int \Sigma_{k=1}^{K} w_k O_k(x,y,\lambda) S_C(\lambda) S_S(\lambda) d\lambda$ or $P(x,y;x,y_j)=\int \Sigma_{k=1}^{K} w_k O_K(x,y,\lambda) S_D(x,y,\lambda) S_S(\lambda) d\lambda$, wherein $P'c(x,y)$ and $P(x,y;x,y_j)$ represent the signal at each color pixel, $S_D(\lambda)$ is the spectral transmission of each color pixel in the color-filter array, $S_S(\lambda)$ is the spectral sensitivity of a sensor pixel, and $S_D(x,y,\lambda)$ is a spatial-spectral point-spread function. In addition, the signal at each color pixel of the spectrum selective element can be determined using at least one of:

$$P'_c(x,y)=\Sigma_{k=1}^{K} O_k(x,y,\lambda_k) S_c(\lambda_k) S_S(\lambda_k) \Delta\lambda; \text{ or}$$
$$P(x,y;x,y_j)=\Sigma_{k=1}^{K} O_k(x,y,\lambda_k) S_D(\lambda_k) \Delta\lambda.$$

In one configuration, the error ($\varepsilon$) associated with the signal at each color pixel can be calculated using at least one of: $\varepsilon=\langle |P'_c(x,y)-P_c(x,y)| \rangle$ or $\varepsilon=\langle |P'(x,y;x,y_j)-P(x,y;x,y_j)| \rangle$, wherein $P'c(x,y)$ and $P(x,y;x,y_j)$ represent the signal at each color pixel of the spectrum selective element. In addition, the one or more perturbations can be performed on the weights ($w_k$) by performing $w_k \rightarrow w_k+\delta$, wherein $\delta$ is a predetermined perturbation.

Figure 7:
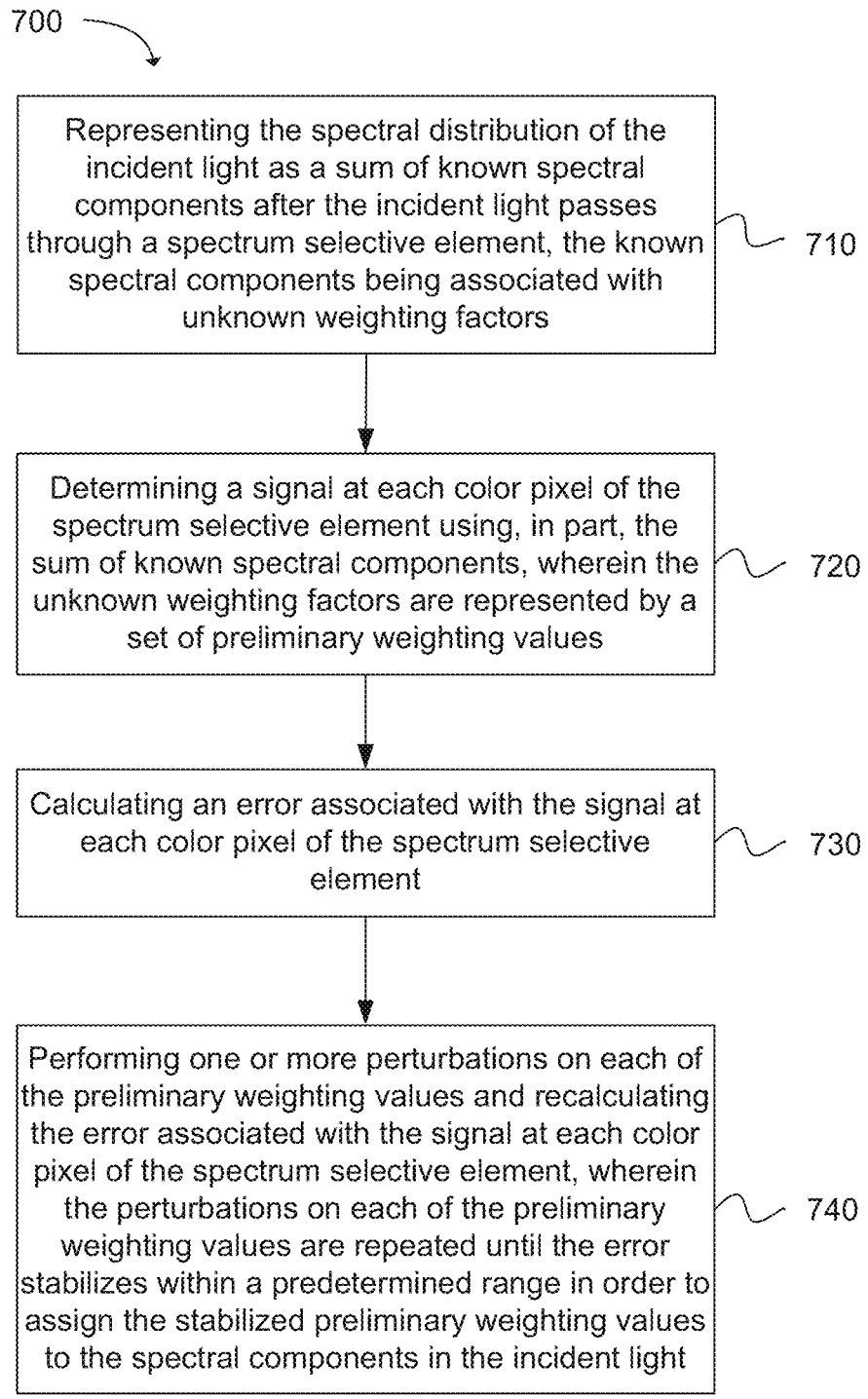
FIG. 7 is a flowchart of another example method for determining a spectral distribution of incident light.

In accordance with one embodiment of the present invention, a method 700 for determining a spectral distribution of incident light is disclosed, as illustrated in FIG. 7. The spectral distribution of the incident light can be represented as a sum of known spectral components after the incident light passes through a spectrum selective element, the known spectral components being associated with unknown weighting factors, as in block 710. A signal at each color pixel of the spectrum selective element can be determined using, in part, the sum of known spectral components, wherein the unknown weighting factors are represented by a set of preliminary weighting values, as in block 720. An error associated with the signal at each color pixel of the spectrum selective element can be calculated, as in block 730. One or more perturbations can be performed on each of the preliminary weighting values and the error associated with the signal at each color pixel of the spectrum selective element may be recalculated, where the perturbations on each of the preliminary weighting values are repeated until the error stabilizes within a predetermined range in order to assign the stabilized preliminary weighting values to the spectral components in the incident light.

In one configuration, the error recalculated after the perturbation is performed on the preliminary weighting value can be determined to be less than the error initially calculated with respect to the signal. The perturbation can be performed on subsequent preliminary weighting values in the set of preliminary weighting values. Alternatively, the error recalculated after the perturbation is performed on the preliminary weighting value may be determined to be greater than the error initially calculated with respect to the signal such that the perturbation can be repeated on the preliminary weighting value.

In another configuration, a modified error associated with the signal can be determined upon repeating the perturbation on the preliminary weighting value, and the perturbation can be retained if the modified error is less than the error recalculated after the perturbation is performed on the preliminary weighting value, or the perturbation can be discarded if the modified error is not less than the error recalculated after the perturbation is performed on the preliminary weighting value. In one example, the set of preliminary weighting values are randomly chosen or based on preliminary knowledge of the spectral distribution of the incident light.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining a spectral distribution of incident light, the method comprising:
passing incident light through a spectrum selective element;
collecting the spectral distribution of the incident light via a sensor;
representing the spectral distribution of the incident light as a sum of spectral components after the incident light passes through the spectrum selective element;
determining a signal from the sensor at each color pixel of the spectrum selective element using, in part, the sum of the spectral components, wherein the spectral components are represented by a set of preliminary values;
calculating an error associated with the signal at each color pixel of the spectrum selective element; and
performing one or more perturbations on each of the preliminary values and recalculating the error associated with the signal at each color pixel of the spectrum selective element, wherein the perturbations on each of the preliminary values are repeated until the error stabilizes within a predetermined range in order to assign the stabilized preliminary values to the spectral components in the incident light.

2. The method of claim 1, wherein the spectral components are each a combination of a known spectra with an unknown weighting factor.

3. The method of claim 1, wherein performing the one or more perturbations is accomplished by perturbations on weights associated with the spectral components according to a predefined number of perturbations.

4. The method of claim 1, wherein the spectral components are each an unknown discrete spectral sample value.

5. The method of claim 1, wherein the set of preliminary values are randomly chosen or based on preliminary knowledge of the spectral distribution of the incident light.

6. The method of claim 1, wherein the spectrum selective element includes a color-filter array in a digital camera.

7. The method of claim 1, wherein the spectrum selective element includes a grating or a polychromat in a spectrometer.

8. The method of claim 1, wherein the spectral distribution of the incident light is determined using a direct-binary search technique.

9. The method of claim 1, further comprising representing the spectral distribution of the incident light as $O(x,y,\lambda) = w_1 O_1(x,y,\lambda) + w_2 O_2(x,y,\lambda) + \ldots + w_K O_K(x,y,\lambda) = \Sigma_{k=1}^{K} w_k O_k(x,y,\lambda)$, wherein $(x,y)$ are spatial coordinates, $\lambda$ is a wavelength, K is a known number of spectral components and $w_k$ are weights.

10. The method of claim 1, further comprising representing the spectral distribution of the incident light as $O(x,y,\lambda) = O_1(x,y,\lambda_1) + O_2(x,y,\lambda_2) + \ldots + O_k = \Sigma_{k=1}^{K} O_k(x,y,\lambda_k)$, wherein $\lambda_k$ are the discrete wavelengths for which the spectral values of the object are unknown.

11. The method of claim 1, further comprising determining the signal at each color pixel of the spectrum selective element using at least one of: $P'c(x,y) = \int \Sigma_{k=1}^{K} w_k O_k(x,y,\lambda) S_C(\lambda) S_S(\lambda) d\lambda$ or $P(x,y;x_i,y_j) = \int \Sigma_{k=1}^{K} w_k O_K(x,y,\lambda) S_D(x,y,\lambda) S_S(\lambda) d\lambda$, wherein $P'c(x,y)$ and $P(x,y;x_i Y_j)$ represent the signal at each color pixel, $S_C(\lambda)$ is the spectral transmission of each color pixel in the color-filter array, $S_S(\lambda)$ is the spectral sensitivity of a sensor pixel, and $S_D(x,y,\lambda)$ is a spatial-spectral point-spread function.

12. The method of claim 1, further comprising determining the signal at each color pixel of the spectrum selective element using at least one of:
$P'_c(x,y) = \Sigma_{k=1}^{K} O_k(x,y,\lambda_k) S_C(\lambda_k) S_S(\lambda_k) \Delta\lambda$ or
$P(x,y;x_i,y_j) = \Sigma_{k=1}^{K} O_k(x,y,\lambda_k) S_D(\lambda_k) \Delta\lambda$.

13. The method of claim 1, further comprising calculating the error ($\varepsilon$) associated with the signal at each color pixel using at least one of: $\varepsilon = \langle |P'_c(x,y) - P_c(x,y)| \rangle$ or $\varepsilon = \langle |P'(x,y;x_i,y_j) - P(x,y;x_i,y_j)| \rangle$, wherein $P'c(x,y)$ and $P(x,y;x_i,y_j)$ represent the signal at each color pixel of the spectrum selective element.

14. The method of claim 1, further comprising performing the one or more perturbations on the weights ($w_k$) by performing $w_k \rightarrow w_k + \delta$, wherein $\delta$ is a predetermined perturbation.

15. The method of claim 1, wherein the sensor is a digital camera and the performing the one or more perturbations allows the digital camera to act as a thermometer to measure a temperature of a human body by using a look up table to match body temperature with a reflectance spectral signal.

16. The method of claim 1, wherein the performing the one or more perturbations is used to measure glucose in blood, measure blood pressure, increase a spectral resolution of a spectrometer, or environmental monitoring.

17. A method for determining a spectral distribution of incident light, the method comprising:
passing incident light through a spectrum selective element;
collecting the spectral distribution of the incident light via a sensor;
representing the spectral distribution of the incident light as a sum of known spectral components after the incident light passes through the spectrum selective element, the known spectral components being associated with unknown weighting factors;
determining a signal from the sensor at each color pixel of the spectrum selective element using, in part, the sum of known spectral components, wherein the unknown weighting factors are represented by a set of preliminary weighting values;
calculating an error associated with the signal at each color pixel of the spectrum selective element; and
performing one or more perturbations on each of the preliminary weighting values and recalculating the error associated with the signal at each color pixel of the spectrum selective element, wherein the perturbations on each of the preliminary weighting values are repeated until the error stabilizes within a predetermined range in order to assign the stabilized preliminary weighting values to the spectral components in the incident light.

18. The method of claim 17, further comprising:
determining that the error recalculated after the perturbation is performed on the preliminary weighting value is less than the error initially calculated with respect to the signal; and
performing the perturbation on subsequent preliminary weighting values in the set of preliminary weighting values.

19. The method of claim 17, further comprising:
determining that the error recalculated after the perturbation is performed on the preliminary weighting value is greater than the error initially calculated with respect to the signal; and repeating the perturbation on the preliminary weighting value.

20. The method of claim 19, further comprising:
determining a modified error associated with the signal upon repeating the perturbation on the preliminary weighting value; and
retaining the perturbation if the modified error is less than the error recalculated after the perturbation is performed on the preliminary weighting value; or
discarding the perturbation if the modified error is not less than the error recalculated after the perturbation is performed on the preliminary weighting value.

21. The method of claim 17, wherein the set of preliminary weighting values are randomly chosen or based on preliminary knowledge of the spectral distribution of the incident light.

22. A system for determining a spectral distribution of incident light, the system comprising:
a spectrum selective element configured to receive incident light;
a sensor configured to receive the incident light that has passed through the spectrum selective element; and
a processor configured to:
determine a signal from the sensor at each color pixel of the spectrum selective element using, in part, a sum of the spectral components representing the spectral distribution of the incident light that passes through the spectrum selective element, wherein the spectral components are associated with a set of preliminary weighting values; and
perform one or more perturbations on each of the preliminary weighting values until an error associated with the signal at each color pixel of the spectrum selective element stabilizes within a predetermined range, wherein the stabilized preliminary weighting values are associated with the spectral components of the incident light.

* * * * *